United States Patent [19]
Kastner

[11] Patent Number: 5,999,326
[45] Date of Patent: Dec. 7, 1999

[54] ACHROMATIC TELESCOPE EYEPIECE WITHOUT DOUBLETS

[76] Inventor: Walter J. Kastner, 947 Parkside La., Lancaster, Pa. 17601

[21] Appl. No.: 09/248,051

[22] Filed: Feb. 10, 1999

[51] Int. Cl.$^6$ .............................. G02B 25/00; G02B 3/00; G02B 13/02

[52] U.S. Cl. ........................ 359/643; 359/642; 359/745

[58] Field of Search ................................ 359/642, 643, 359/745, 399, 168, 171

[56] References Cited

U.S. PATENT DOCUMENTS 5,161,052  11/1992  Hill ........................................ 359/377

OTHER PUBLICATIONS

A copy of pp. 91–96 from Astronomy Magazine, Jun. 1998. Article on Telescope eyepieces.

*Primary Examiner*—Georgia Epps
*Assistant Examiner*—Michael Lucas
*Attorney, Agent, or Firm*—John V. Stewart

[57] ABSTRACT

A telescope eyepiece comprising a series of single-element lenses in a combination that cancels chromatism. A negative field lens produces chromatism that is partly cancelled by an intermediate positive lens. The resulting red and blue focal points behind the intermediate lens are exactly matched by the same focal points for parallel rays assumed to originate from behind the eye lens passing forward, thus creating an achromatic system that cancels the remaining chromatism. An additional one or two intermediate positive lenses may be added to increase the field of view and reduce the curvature of field. The eyepiece designer can set the distortion of the system to zero, or can adjust it in a range from minor pincushion to minor barrel distortion as desired. Spherical aberration is corrected by the selection of curves for the field lens. Astigmatism is corrected by the spacing of the field lens from the next intermediate lens. Different optical glasses are utilized to maximize the apparent field and minimize other aberrations. However, an acceptable 50 degree field-of-view eyepiece can be made using four elements of the same type of optical glass, such as fused silica. In this case, the ultraviolet, visible, and infrared rays are all in focus at once, providing perfect achromatism, as with mirrors.

7 Claims, 1 Drawing Sheet

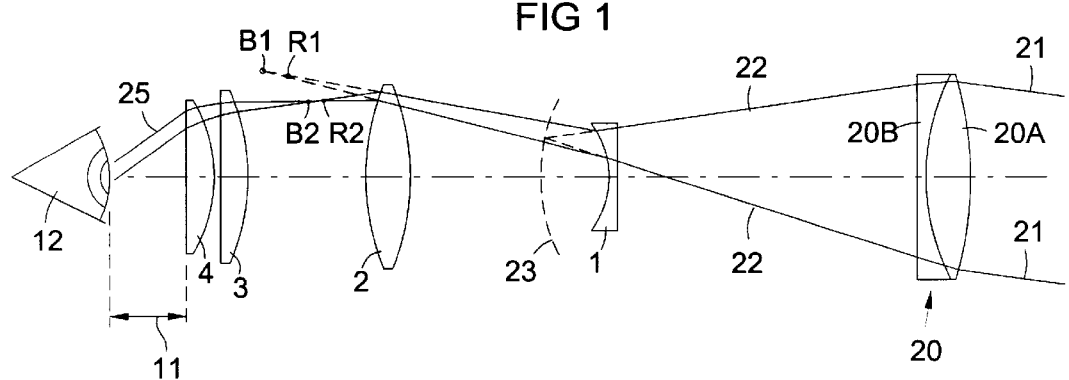
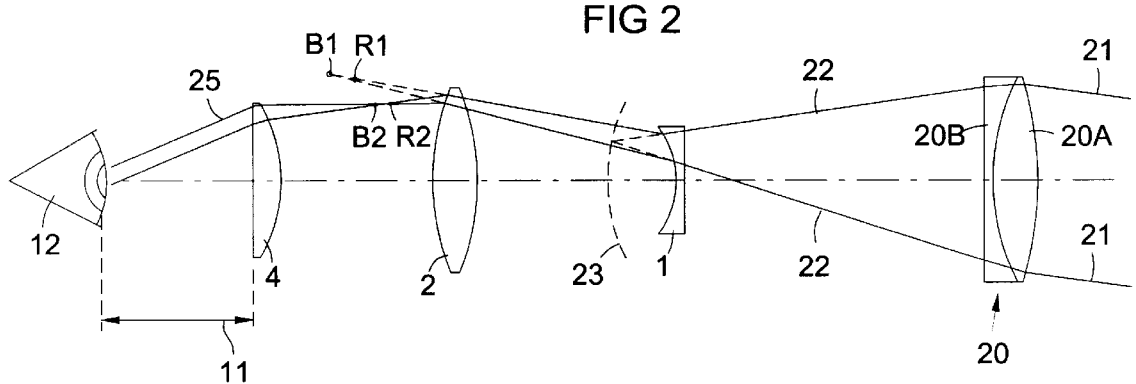
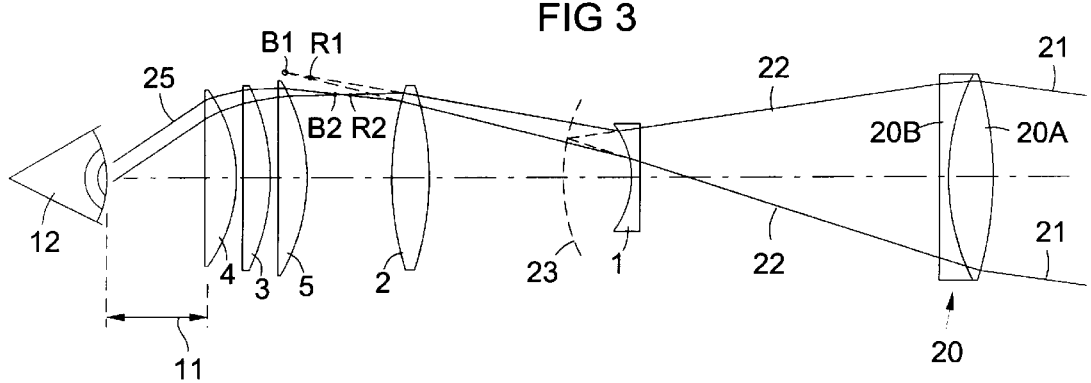

ACHROMATIC TELESCOPE EYEPIECE WITHOUT DOUBLETS

BACKGROUND OF THE INVENTION

1. Field of the Invention

This invention is in the field of telescope eyepiece design.

2. Description of Prior Art

The eyepiece of an optical telescope comprises a series of lenses to provide light refraction for magnification and focus. Refractive lenses produce several distortions and aberrations, including color separation, or chromatic aberration. The eye relief and the field of view of an eyepiece are limited by the correlation between the refractive power of the lenses and the magnitude of distortions.

Color distortion is caused by a difference in focal lengths for different colors of light passing through a lens. Higher frequencies of light (blues) are refracted more than lower frequencies (red). Thus, parallel rays of white light passing through a positive (convex) lens will separate into colors, with blues focussed shorter than reds.

Color distortion is counteracted in conventional eyepieces by using two or more lenses of different optical characteristics cemented together. For example, a convex-convex lens of crown glass can be cemented to a plano-concave lens of flint glass. Flint glass has a higher refractive index than crown glass, and much higher dispersion, or color separation. The two lens elements are matched such that the concave lens only partly counters the refraction of the convex lens, but fully counters its dispersion. The result is a net positive combined lens with no chromatism, called an achromatic doublet. Sometimes more than two lenses are cemented together to optimize the design for a particular use.

Numerous telescope eyepiece designs are available, including Huygens, Ramsden, Tolles, Hastings, Steinheil, Kellner, Orthoscopic, Plossl, Erfle, Aspheric, Bertele, Tele Vue Wide-Angle, Nagler types 1 and 2, and RKE. The simpler ones have a small field of view and noticeable aberrations, possibly including chromatism. The best-performing designs use achromatic doublets to correct many of these faults, but are expensive and often have faults anyway.

A characteristic of some eyepieces is a kidney-bean-shaped black cloud that appears in the image unless the eye is located precisely at the eyepiece. For example, the Nagler type 1 eyepiece has an 82-degree field of view, but exhibits "kidney bean" aberration, and it uses 7 lens elements with three doublets. The Nagler Type 2 eyepiece reduces this problem, but requires three doublets and a total of 8 lens elements. The Nagler eyepieces also have pincushion distortion.

Curvature of field is a substantial disadvantage for older viewers, since eye accommodation lessens with age due to hardening of the lens in the eye. Curvature of field in an eyepiece thus causes the edge of the field to be out of focus for an older person, limiting the useful field without an eyepiece focus adjustment. A young person's eye can easily change diopter enough to quickly adjust focus as the view goes from center to edge. Thus, a young viewer is hardly aware of the eyepiece curvature of field. Astigmatism toward the edge of the field reduces resolution. Many people, especially beginners, are content to live with off-axis aberrations like curvature and astigmatism, especially if the eyepiece is a bargain in price. For a sharper image, one can center the object in the eyepiece.

Inadequate eye relief (distance of the eye from the lens) is a problem on some eyepieces, allowing the eyelashes to brush the eye lens, coating it with body oils, which quickly reduces resolution. A Kellner has very good color correction. If the elements are multicoated, it is probably as good optically as an Orthoscopic, but the eye relief is small. One sweep of the eyelashes and the crispness of view is lost. This is why many astronomers prefer Orthoscopics, which allow viewing all night without having to clean the eyepiece. However, the apparent field of view is only about 40 degrees in both the Kellner and Orthoscopics, so they are best suited for planetary viewing. The RKE (Edmund) is a design based on the Kellner with better eye relief, but it still has a small field. A small field can be an advantage for planetary viewing because extraneous items are automatically eliminated. However, for general viewing, once a person looks through a good wide-field eyepiece, he will probably be dissatisfied with anything under about a 60-degree field. Narrower fields give the impression of looking through a tunnel. It is better to have a good wide-field eyepiece with an adjustable aperture which can be reduced to concentrate on one object for a period of time.

The Kellner 3-element eyepiece (with one doublet) has good color correction and fair edge sharpness, but has appreciable astigmatism and curvature of field with only a 40 to 45 degree field width. The Orthoscopic 4-element eyepiece (with one triplet) has high image contrast and very good color correction, but has appreciable field curvature and astigmatism at the edge of a 40 to 45 degree field. The Plossl 4 to 7 element eyepiece has good image sharpness across 36 to 52 degrees, and perfect achromatism, but has noticeable astigmatism starting 15 degrees from the center of the field, and it uses doublets. The Pentax XL, Meade Super WideAngle, and TeleVue Panoptic 5 to 8 element widefields have 60 to 70 degree fields and excellent image sharpness and contrast. The Naglers and Meade Ultra Wide Angle 7 or 8 element have fields of 80 degrees or more. However these wide and ultrawide field eyepieces use doublets, usually have noticeable distortion, some kidney bean aberration, and their resolution is noticeably reduced below f/4.5 or f/4. They are also very heavy, and may not be capable of incorporating the atmospheric dispersion correction of U.S. Pat. No. 5,696,635, but may require a different more costly approach.

Wide-field eyepieces are becoming more popular. If it were not for the cost, these are what most viewers would probably choose, not only for the wide field, but because the image looks sharp and more natural over the whole field. Inexpensive eyepieces often have fields effectively narrowed by aberrations toward the edges, such as field curvature, distortion, astigmatism, and excessive color. Such eyepieces may only provide 25–30 degrees of useable field width, although additional unusable field width is sometimes provided for exaggerated advertising claims. However, present widefields are excessively large, heavy, and costly.

Achromatic doublets are more expensive than simple lenses, due to the additional lens elements, the design work and precision required to match a common surface, and the assembly steps of gluing them together. They are also heavier than simple lenses. It would be an advantage to eliminate them if chromatism could be avoided while providing high refractive control, a wide field of view, and avoiding other distortions and aberrations.

SUMMARY OF THE INVENTION

The objective of the invention is provision of a telescope eyepiece with complete color correction to the edge of the field, no distortion, no "kidney bean" aberration, good spherical and astigmatism corrections to the edge of the field, acceptable field curvature, no lateral chromatic aberration, and sharp focus to the edge of the field with focal ratios down to f/3.5, all without using achromatic doublets. Another objective is provision of a wide field of view. Another objective is simplification over current eyepiece designs for lower cost. Another objective is an eyepiece with design adjustment of distortion to zero, or ranging from minor pincushion to barrel per the designer's preference. Another objective is optional inclusion of atmospheric dispersion compensation per U.S. Pat. No. 5,696,635 by this inventor.

These objectives are achieved in an eyepiece with a matched series of simple refractive lenses in a particular combination that cancels chromatism. A negative field lens produces chromatism that is partly cancelled by an intermediate positive lens. The resulting red and blue focal points behind the intermediate lens are coincident in space with the respective focal points for parallel rays assumed to pass forward from behind the eye lens, thus creating an achromatic system that cancels the remaining chromatism. An additional one or two intermediate positive lenses can be added to increase the field of view.

BRIEF DESCRIPTION OF THE DRAWINGS

FIG. 1 Shows a schematic side sectional view of a four-element embodiment of the invention.

FIG. 2 Shows a schematic side sectional view of a three-element embodiment of the invention.

FIG. 3 Shows a schematic side sectional view of a five-element embodiment of the invention.

REFERENCE CHARACTERS

B1. Blue focus of converging rays 22 after passing through field lens 1
R1. Red focus of converging rays 22 after passing through field lens 1
B2. Blue focus of the parallel rays 25 traced forward from behind the eye lens. Also the blue focus of converging rays 22 traced backward from the objective lens after passing through the field lens 1 and the intermediate lens 2.
R2. Red focus of the parallel rays 25 traced forward from behind the eye lens. Also the red focus of converging rays 22 traced backward from the objective lens after passing through the field lens 1 and the intermediate lens 2.
1. Field lens, negative
2. First intermediate lens behind field lens, positive
3. Optional second intermediate lens between the first intermediate lens and the eye lens, positive
4. Eye lens
5. Optional third intermediate lens between the first intermediate and the second intermediate lens, positive
11. Eye relief, or distance from the user's eye to the eye lens
20. Objective lens, shown as an achromatic doublet
20A. Convex element of objective lens
20B. Concave element of objective lens
21. Off-axis parallel light rays from distant point source being viewed
22. Focused off-axis light cone from object rays 21
23. Focal "plane" of objective lens
25. Parallel light rays assumed to originate from behind the eye lens, traced from behind the eye lens forward. Also, the actual parallel bundle of light rays exiting the back of the eye lens.

TERMINOLOGY

Forward Toward the object being viewed. Toward the objective from the eye lens.
Backward Toward the eye lens from the objective. Toward a user's eye from the eyepiece.
Element A lens ground and polished from a single discrete piece of optical glass.

DESCRIPTION OF THE PREFERRED EMBODIMENTS

A new design for a telescope eyepiece is shown schematically in FIGS. 1–3. It is in effect achromatic without using achromatic doublets. This design uses 3, 4, or 5 simple lens elements as shown in FIGS. 2, 1, and 3 respectively. The eyepiece can be used in both refractive and reflective telescopes. The 4-element version shown in FIG. 1 is the preferred embodiment, having an optimum tradeoff of features and cost.

The 3-element design (FIG. 2) provides about 50 degrees apparent field of view, the 4-element design (FIG. 1) provides about 72 degrees, and the 5-element design provides more than 72 degrees. The eye lens 4 can have a flat back surface to be used for atmospheric dispersion correction per U.S. Pat. No. 5,696,635, if desired. However, this is not necessary for the present patent, and a curved back surface may optimize the refractive accuracy of this design. Element 1 is a simple negative field lens. The ray trace of an off-axis light cone 22 from the objective 20 shows that the blue rays B1 focus farther away than the red rays R1 after passing through the field lens. Element 2 is a positive element and shows the best correction if both surfaces are convex. The rays emanating backward from element 1 are caught and redirected by element 2 toward element 3, 4, or 5. Element 3 is positive, and redirects the rays toward element 4 at an improved angle, allowing a wider field of view than the 3-element version.

Element 4 is a positive eye lens. It bends the rays down and parallel if the eyepiece is focused correctly, so that the eye will see these rays as coming from infinity, or from the star through the objective and ocular. Looking toward the objective from the eye lens, the parallel rays 25 have their blue focus B2 inside the red focus R2. This is a positive lens combination, and blue light is focused more strongly than red. If the curves, spacing, glass types, and thicknesses of all the elements are suitable, the foci of red and blue rays from elements 1 and 2 match the foci of red and blue rays from element 3, 4 or 5, creating an achromatic system. In other words, the blue rays passing backward from elements 1 and 2 and the equivalent blue rays passing forward from element 3, 4, or 5 meet at a common focal point, and likewise for the red rays. The radial displacements of these foci from the optical axis may not match exactly, but this does not noticeably reduce the resolution at the edge of the field in the prototype.

Using four elements of various types of optical glass, a prototype was made with 72 degrees field of view, complete color correction to the edge of the field, no distortion (can vary from slight pincushion to slight barrel with minor spacing adjustment), no "kidney bean" views, good spherical correction and good astigmatism correction to the edge of the field, acceptable field curvature (can be varied somewhat to compensate for different objective systems and focal lengths), no lateral chromatic aberration, and sharp focus to the edge of the field even at wide light cones down to f/3.5. The eye relief of the prototype is satisfactory, and can be improved by having the rays exit element 2 at a still diverging angle or horizontal, adding another positive element 5 as in FIG. 3, and enlarging elements 3 and 4. However, this adds significantly to the weight and cost of the eyepiece.

The prototype consists of the following types of optical glass: element 1 is a low index low dispersion glass such as Schott FK3 or BK7; element 2 is a high index high dispersion glass such as Schott F2 or SF3; element 4 is a high index medium or high dispersion glass such as Schott LaK28. Element 3 can be same type as element 4, or other types including F or SF. For optimization of color correction it is best to determine the glass for element 3 after the other elements are selected. This patent is not limited to these types, since new glass types may be developed that work better, or the cost and light transmission of existing types may improve. The glass types, curves, thicknesses, and spacings of the elements can be adjusted to optimize other aberration corrections as desired. Each element should preferably have an antireflection coating on both sides for the best contrast.

Distortion in eyepieces can range from pincushion to barrel-shaped. Most people prefer some pincushion over any barrel distortion because it looks more natural. Any substantial distortion is objectionable for terrestrial viewing, while still acceptable for viewing celestial bodies except perhaps Jupiter, Saturn, or the Lunar landscape near the edge of the field. The present design can be adjusted from minor pincushion to minor barrel, including zero distortion, with slight spacing changes (which may require curve changes to maintain other corrections). The present design does not have "kidney bean" aberration.

Following are design considerations for each lens element, for eyepiece designers familiar with existing eyepieces.

Element 1 is the main control for spherical aberration by the curve ratio between the front and back sides. The larger the diameter of element 1, the lower the f/no. possible for the eyepiece, all other parameters being equal. A steeper curve on the back side of element 1 flattens the field focus curvature more, and can be adjusted (including by adding element 5) to match most objectives without resorting to an achromatic doublet here. A stronger negative element 1 also improves the f/no. by narrowing the cone for the other lenses. A stronger negative element 1 is useful in reducing the effective focal length of the eyepiece, but with a single element there is a limit on color correction of the system as strength increases. Astigmatism can be corrected by adjusting the spacing between elements 1 and 2.

Element 2 intercepts rays from element 1 and directs them toward element 3, 4, or 5, depending on the version. It also reduces the color spread from element 1. The spacing of element 2 from 3 and 4 determines pincushion or barrel distortion. If the dispersion of the glass of element 2 is not high enough, there will be problems in correcting other aberrations when color is corrected.

Element 4 is the basic magnifier of the eyepiece. The other lenses exist largely to correct for aberrations present in this lens. Element 4 determines the apparent field and should match the color spread with the residual spread from element 2. If element 4 is made strong enough to exceed 50 degrees field of view, the edge aberrations become too great. A stronger lens also means a smaller diameter lens, reducing eye relief. Thus, 50 degrees is about the maximum field of view of the 3-element version of this eyepiece design. Adding another one or two positive lens elements 3, or 3 and 5, allows element 4 to act as a stronger lens without excessive curve, which improves the curvature of field. The combination of positive elements 3 and 5 redirects the rays toward element 4 at an improved angle, allowing a wider field of view and/or better eye relief. If there is still some color after all other parameters are adjusted for minimum aberrations, it can be eliminated by fine tuning the spacing between elements 3 and 4. However, a preferable fine adjustment is to move elements 3 and 4 as a unit in relation to 1 and 2, since the aperture stop at the front of said unit will remain in focus, the adjustment will be less, and the field angle will not change as much.

Further adjustments of the spacings noted in the above paragraphs can correct any residual edge astigmatism and red/blue color in any well-made objective lens to which the eyepiece is mated.

The present three, four, or five element eyepiece design has respective capabilities of 50 degrees, 72 degrees, and wider apparent field of view, with good color correction and high correction of other aberrations to the edge of the field. This design produces sharp, high contrast images down to f/3.5 from the objective, and can utilize the simple and quick atmospheric dispersion correction of U.S. Pat. No. 5,696,635. Thus it has substantial advantages over the other telescope eyepiece designs mentioned in the Prior Art section herein.

An acceptable 50-degree field-of-view eyepiece can be made using four elements of the same type of optical glass, such as fused silica. Since all elements have the same dispersion in relation to refraction, all wavelengths of light are compensated exactly. Thus, ultraviolet, visible, and infrared rays are all in focus at the same time (assuming a mirror objective). This provides perfect achromatism, as with mirrors, from four simple elements of the same type of optical glass. A prototype was made with 4 separate elements, all of fused silica. It is well-corrected, with a 10 mm focal length and a 55-degree field of view.

Although the present invention has been described herein with respect to preferred embodiments, it will be understood that the foregoing description is intended to be illustrative, not restrictive. Modifications of the present invention will occur to those skilled in the art. All such modifications that fall within the scope of the appended claims are intended to be within the scope and spirit of the present invention.

I claim:

1. An improved telescope of the type having an objective, and further having an eyepiece with an optical axis and front and back ends, the front end of the eyepiece receiving a cone of converging light focussed by the objective from a distant point source, the improvement residing in a series of simple refractive elements axially aligned in the eyepiece, comprising:

a positive eye lens in the back end of the eyepiece;

a negative field lens in the front end of the eyepiece;

a first red focus and a first blue focus with respect to the cone of light passing backward through the field lens;

a first positive intermediate lens located between the first red focus and the field lens;

a second red focus and a second blue focus with respect to the cone of light passing backward through both the field lens and the intermediate lens, the second red and blue foci being between the first intermediate lens and the eye lens;

a third red focus and a third blue focus with respect to parallel light rays assumed to originate from behind the eye lens passing forward through the eye lens;

the second red focus and third red focus axially coincident;

the second blue focus and third blue focus axially coincident;

whereby, the light cone passing through the eyepiece from the field lens to the eye lens will be refracted to parallel rays exiting the eye lens without chromatism.

2. The eyepiece of claim 1, further including:

a second intermediate positive lens located between the eye lens and the third red and blue foci; and the third red and blue foci as modified by the second intermediate lens are axially coincident with the second red and blue foci respectively.

3. The eyepiece of claim 2, further including:

a third intermediate positive lens located between the second intermediate lens and the third red and blue foci; and the third red and blue foci as modified by the second and third intermediate lenses are axially coincident with the second red and blue foci respectively.

4. An achromatic eyepiece for a telescope, comprising:

an optical axis;

a negative single-element field lens on the optical axis, having front and back sides;

a positive single-element eye lens on the optical axis behind the field lens, having front and back sides;

converging light rays from ahead of the field lens passing backward through the field lens;

first red and blue focal points behind the fields lens with respect to said converging light rays passing backward through the field lens;

a first intermediate single-element positive lens located on the optical axis between the field lens and the eye lens, between the first focal points and the field lens, said converging light rays passing backward through the first intermediate lens;

second red and blue focal points between the first intermediate lens and the eye lens with respect to said converging light rays passing backward through the first intermediate lens;

third red and blue focal points with respect to parallel light rays assumed to originate from behind the eye lens passing forward through the eye lens;

the third red and blue focal points coincident in space with the second red and blue focal points respectively;

whereby, a light cone from a telescope objective passing backward through the field lens will be refracted to parallel rays exiting the eye lens without chromatism.

5. The eyepiece of claim 4, further including:

a second intermediate single-element positive lens located on the optical axis between the eye lens and the first intermediate lens;

fourth red and blue focal points with respect to parallel light rays assumed to originate from behind the eye lens passing forward through both the eye lens and the second intermediate lens, coincident in space with the respective red and blue focal points of the first intermediate lens.

6. The eyepiece of claim 5, wherein the field lens, eye lens, and the first and second intermediate lenses are all of the same type of optical glass.

7. The eyepiece of claim 5, further including:

a third intermediate single-element positive lens located on the optical axis between the second intermediate lens and the first intermediate lens;

fifth red and blue focal points with respect to parallel light rays assumed to originate from behind the eye lens passing forward through the eye lens, the second intermediate lens, and the third intermediate lens, coincident in space with the respective red and blue focal points of the first intermediate lens.

* * * * *